March 16, 1943.  B. M. LEECE  2,314,225
REGULATOR UNIT AND MOUNTING
Filed Nov. 18, 1941  2 Sheets-Sheet 1

INVENTOR.
BENNETT M. LEECE
BY Kwis Hudson & Kent
ATTORNEYS

March 16, 1943.  B. M. LEECE  2,314,225
REGULATOR UNIT AND MOUNTING
Filed Nov. 18, 1941  2 Sheets-Sheet 2

INVENTOR.
BENNETT M. LEECE
BY Kwis Hudson & Kent
ATTORNEYS

Patented Mar. 16, 1943

2,314,225

UNITED STATES PATENT OFFICE 2,314,225

REGULATOR UNIT AND MOUNTING

Bennett M. Leece, Shaker Heights, Ohio, assignor to The Leece-Neville Company, Cleveland, Ohio, a corporation of Ohio Application November 18, 1941, Serial No. 419,608

2 Claims. (Cl. 173—328)

This invention relates to electrical regulating devices and their mountings, and, as its principal object, aims to provide an improvement in apparatus of this kind in which a panel permanently connected with a motor vehicle and with the external regulator circuits forms a mount for detachably supporting a regular unit and operatively connecting the same with said external circuits.

Another object of the invention is to provide improved apparatus of this kind in which an electrical regulator can be connected with or disconnected from its external circuits merely by applying the regulator unit to or removing the same from an insulating panel forming a mount for the regulator unit.

A further object of this invention is to provide improved apparatus, of the character referred to, embodying novel means forming a releasable connection between the regulator unit and the panel.

The invention may be further briefly summarized as consisting in certain novel combinations and arrangements of parts hereinafter described and particularly set out in the appended claims.

Figure 1:
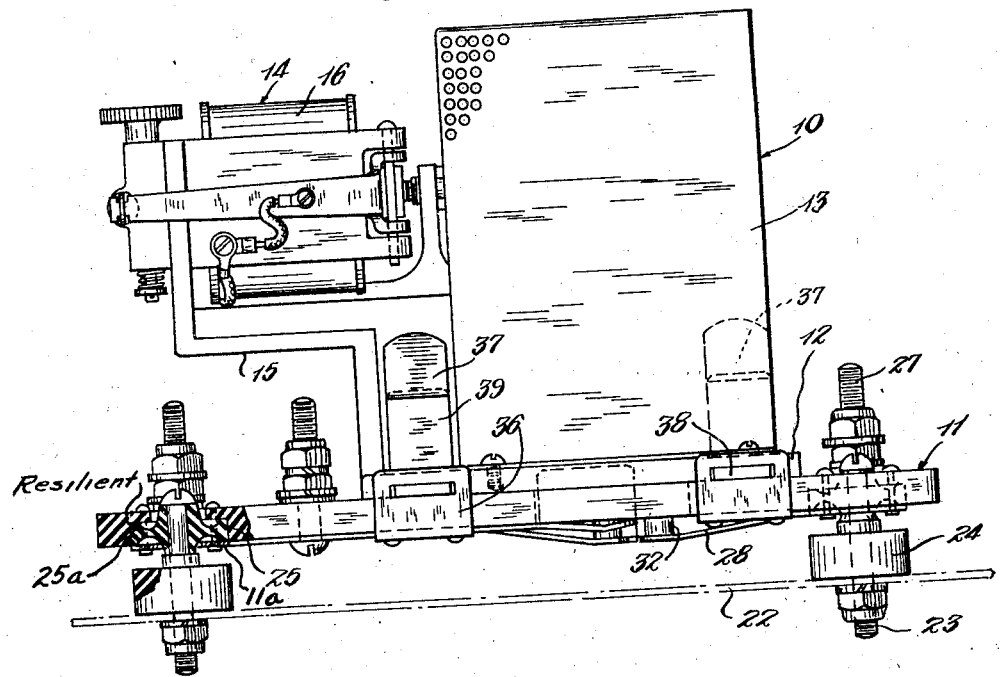
Fig. 1 is a side elevation of my improved regulator unit and mount.
Figure 2:
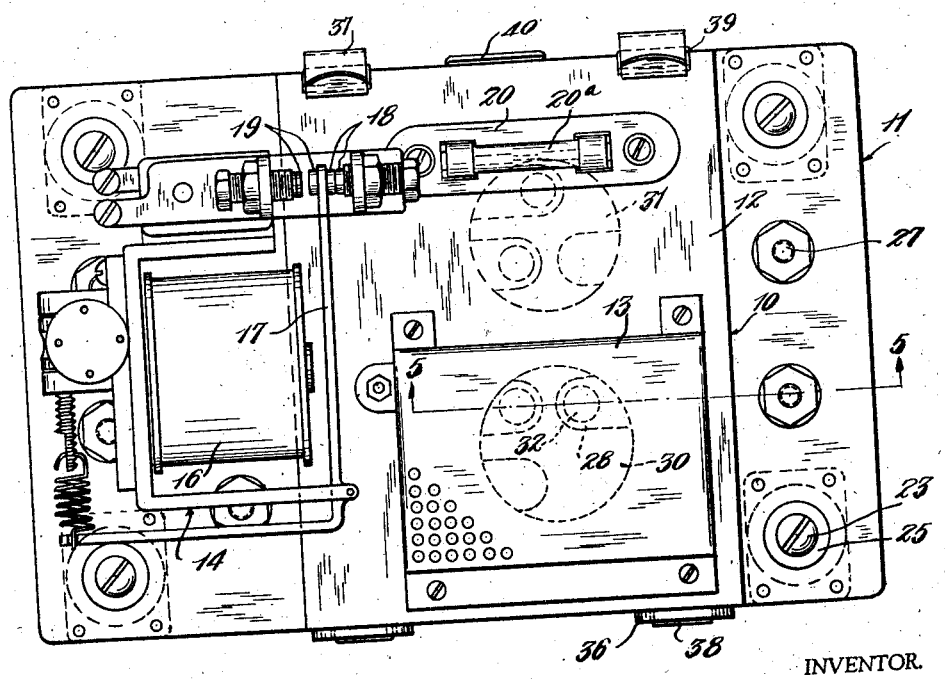
Fig. 2 is a top plan view thereof.
Figure 3:
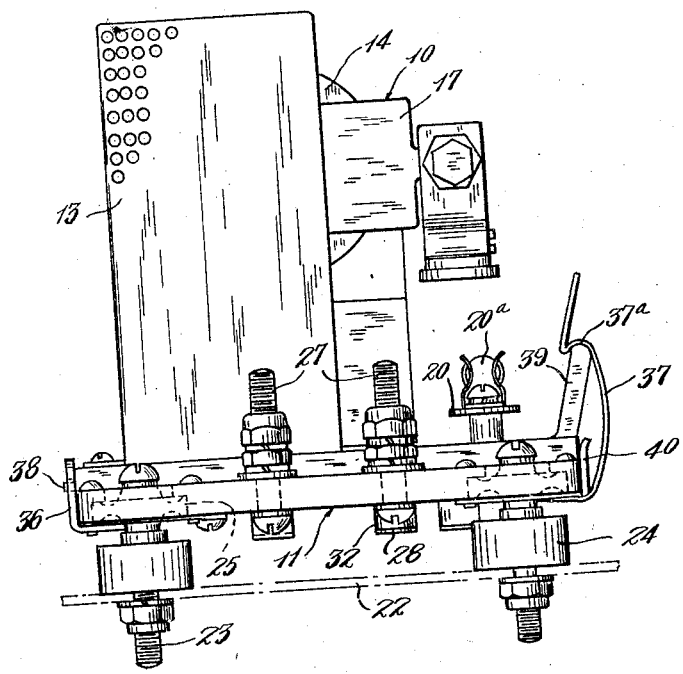
Fig. 3 is an end view thereof.

Reference will now be made in greater detail to the regulator unit and mounting shown in the drawings, but it will be understood, of course, that the invention is not limited to the particular apparatus herein disclosed but includes various other forms of apparatus of this kind coming within the scope of the appended claims.

In the drawings I show a regulator unit 10 and a panel 11 forming a mount for detachably supporting the regulator unit and connecting the same with its external circuits. The regulator unit 10 may be any one of various kinds of electrical regulating devices, such as a voltage regulator of the electromagnetic type adapted to be used with the generator which supplies current to the auxiliaries of an aircraft or other motor vehicle.

The regulator unit 10 shown in this instance comprises a plate-like base 12, and a resistor unit 13 and a relay 14 carried by such base. The resistor unit 13 may be supported directly on the upper side of the base and the relay 14 may be supported by an upwardly and laterally extending bracket portion 15 of the base. The relay may comprise a magnet coil 16 and an armature 17 adapted to be moved or vibrated by the magnet coil to cause opening and closing of pairs of cooperating contacts 18 and 19 by which the control functions of the regulator unit are made effective. When the regulator is a voltage regulator being used with a shunt generator, the resistance contained in the resistor unit 13 may be intermittently connected into and disconnected from the shunt field circuit of the generator by the opening and closing of one pair of said contacts. The regulator unit may also include a fuse block 20 mounted on the base 12 and carrying a fuse 20a which is suitably connected electrically with the other parts of the regulator unit.

The panel 11 may comprise a plate-like body of insulating material which may be more or less permanently connected with an available supporting portion 22 of the structure of an aircraft or other motor vehicle. This panel may be rectangular in shape and of a size to conveniently receive the regulator unit 10 thereon and may be connected with the supporting structure 22 by screws 23 located at the four corners of the panel. The connections between the panel and the supporting structure 22 preferably include insulating spacers 24 surrounding the screws and located between the panel and the supporting structure. These connections may also include vibration-absorbing bushings 25, formed of soft rubber or other resilient material, which surround the screws 23 at their point of connection with the panel 11 and are retained in openings 25a of the panel by the clamping plates 11a so as to permit relative tilting between the screws and the panel.

The regulator unit 10 may be referred to as a "plug-in" regulator because, when it has been applied to the panel 11, it is electrically connected with the external regulator circuits and the mere disconnecting of the regulator unit from the panel, for testing, repairing or other purposes, removes the regulator from such external circuits without disturbing any of the wiring and can be accomplished even by an unskilled workman. To this ...d the panel 11 is provided with means for d ..chably connecting the regulator unit therewith both mechanically and electrically.

Figure 4:
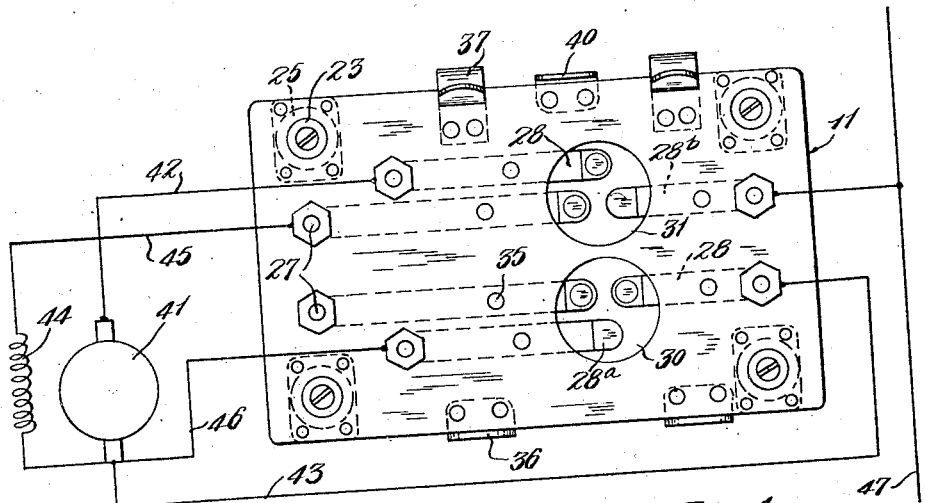
Fig. 4 is a plan view, partly diagrammatic in form, showing the mount with the regulator unit removed and also showing the external regulator circuits connected to the mounts.
Figure 5:
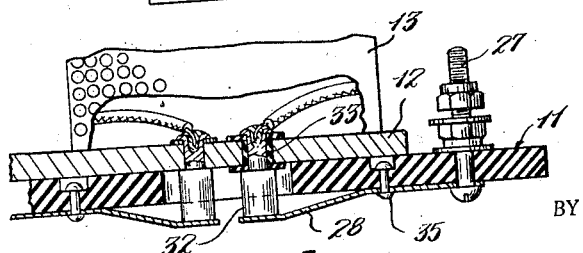
Fig. 5 is a partial longitudinal sectional view taken through the regulator unit and mount substantially as indicated by line 5—5 of Fig. 2.

For the purpose of the electrical connections to the regulator unit, I provide the panel 11 with a plurality of terminal posts 27 which are more or less permanently connected with the wiring forming the external regulator circuits, such as the wiring illustrated in Fig. 4 and to be described hereinafter. The electrical connections for the regulator unit also include a plurality of resilient fingers or contact elements 28 located on the underside of the panel 11 and having their outer ends connected with the respective terminal posts 27. The resilient fingers or contact elements 28 are preferably arranged in groups, as shown in Fig. 4, with their inner ends extending into or beneath openings 30 and 31 formed in the panel 11. In this instance I show two such groups of these contact elements and two of the panel openings so as not to unduly weaken the panel, but it will be understood, of course, that the contact elements can be arranged in one group or a plurality of groups and that the panel may be provided with one opening or a plurality of openings.

The regulator unit 10 does not have any leads extending therefrom in the form of wires or flexible conductors, but has a plurality of terminal members 32 thereon which project from the underside of the base 12 and engage the contact elements 28 when the regulator unit is applied to the panel. The terminal members 32 may be in the form of substantially rigid post-like members which are suitably mounted on or in the base 12 and are electrically connected with the internal circuits of the regulator unit. Certain of the terminal members 32 may be insulated from each other and from the base 12 by insulating bushings 33. These terminal members are located on the base 12 so as to engage the appropriate contact elements 28 of the panel 11 to properly complete the regulator circuits when the regulator unit is connected with the panel 11, and for this purpose the terminal members may be arranged in groups corresponding with the grouping of the contact elements 28 of the panel.

The openings 30 and 31 of the panel are of appropriate size to freely admit the groups of terminal members of the regulator unit and the terminal members are of a length such that when the regulator unit is in assembled position on the panel, as shown in Fig. 1, they will somewhat deflect the contact elements 28 so as to form a good electrical connection at this point. If desired, the contact elements 28 and the terminal members 32 may be silver-plated to insure a good electrical connection being obtained. Ordinarily the contact elements 28 of the panel 11 will correspond in number with the terminal members 32 of the regulator unit, but in some cases the panel may be provided with one or more additional contact elements, such as the elements 28a and 28b shown in this instance, which are used in certain hookups as when two regulator units are applied to generators being operated in parallel or when a different form of regulator unit is to be applied to the same panel. To retain the contact elements 28, 28a and 28b in proper position on the panel and to improve the resilient character of these elements, I may use a rivet 35 as an auxiliary connecting means for each contact element and which rivets are spaced from the terminal posts 27 and prevent the contact elements from swinging about such posts.

The mechanical means for detachably connecting the regulator unit 10 with the panel 11 may assume various forms. In this instance I show the panel provided with a pair of slotted ears 36 adjacent one side or edge thereof and a pair of resilient latch members 37 adjacent the other side or edge thereof. For cooperation with the ears 36 and the latch members 37, I provide the base 12 of the regulator unit with a pair of laterally extending lugs 38 at one side or edge thereof and a pair of upstanding lugs 39 adjacent the opposite side or edge thereof. The laterally extending lugs 38 are so located and are of a size to engage in the slots of the ears 36 of the panel so as to form a hinge connection between the regulator unit and one side or edge of the panel. After the lugs 38 have been engaged in the slots of the ears 36, the regulator unit can be swung toward the panel 11 so as to cause the upstanding lugs 39 to move into a locked or latched position beneath the hook-like portions 37a of the resilient latch members 37. When this has occurred, the regulator unit will be firmly but releasably connected with the panel and the terminal members 32 of the regulator unit will be held in good electrical engagement with the resilient contact elements 28 and the regulator unit will then be electrically connected with its external circuits. At a point between the latch members 37 I may provide the panel 11 with an upstanding lug 40 which engages the corresponding side or edge of the base 12 of the regulator unit and prevents lateral shifting of the regulator unit in a direction tending to disengage the lugs 38 from the slots of the ears 36.

In Fig. 4 I have shown the terminal posts 27 of the panel connected with the external circuits of the regulator unit. Although various external circuit arrangements may be provided, they will, as shown in this instance, usually include a generator 41 having its terminals connected with two of the terminal posts 27 by the conductors 42 and 43, and a shunt field 44 having its outer end connected with another of the terminal posts 27 by the conductor 45. The external circuit arrangements may also include paralleling connections 46 and 47 extending to the terminal posts of the contact elements 28a and 28b and which may be needed when two or more regulator units are used with generators which are to be operated in parallel.

From the foregoing description and the accompanying drawings, it will now be readily understood that I have provided an improved regulator unit and mounting in which a voltage regulator or like unit can be detachably applied to a mount, formed by a panel which is more or less permanently connected with the structure of the aircraft or other motor vehicle on which the regulator is to be used, and in which the mere application or removal of the regulator unit connects the same with or disconnects the same from its external circuits.

While I have illustrated and described my improved apparatus in a more or less detailed manner, it will be understood, of course, that I do not wish to be limited to the particular regulator unit and mounting herein disclosed, but regard my invention as including all variations and modifications thereof coming within the scope of the appended claims.

Having thus described my invention, I claim:
1. In apparatus of the character described, an electrical regulator unit having a base provided with projecting terminal members located intermediate the sides of the base and electrically connected with the regulator, a laterally projecting lug on said base at one side thereof and an upstanding lug on said base at the opposite side, a support for the regulator unit comprising a panel formed of insulating material and adapted to be mounted on a motor vehicle, said panel having terminals thereon for permanent connection with the external regulator circuits and also having spring contact elements connected with said terminals and located intermediate the sides of the panel to automatically make electrical connection with the terminal members of the regulator unit when the latter is connected with said panel, a slotted lug on said panel adjacent one side thereof adapted to receive said laterally projecting lug to form a hinge connection between the regulator unit and panel, said panel having at the side opposite said slotted lug a second lug adapted to engage the corresponding side of said base for retaining said projecting lug engaged in said slotted lug, and a spring latch member on the panel adjacent said opposite side thereof and adapted for releasable locking engagement with said upstanding lug for retaining said base in engagement with said second lug.

2. In apparatus of the character described, an electrical regulator unit having a base provided with a group of terminal members projecting from the bottom thereof and located intermediate the sides of the base, said terminal members being insulated from each other and electrically connected with the regulator, a support for the regulator unit comprising a panel formed of insulating material and adapted to be mounted on a motor vehicle, said panel having terminals thereon for permanent connection with the external regulator circuits and also having an opening intermediate its sides of a size to freely receive said group of terminal members, a plurality of spring fingers connected with said terminals and lying adjacent the underside of the panel with portions of said fingers extending into said opening so as to be automatically engaged by said terminal members of the regulator unit when the latter is connected with said panel, a slotted upstanding lug on the panel at one side thereof and a second upstanding lug on the panel at the opposite side thereof, said base being of a width to be snugly received between said upstanding lugs and itself having a laterally extending lug engageable in said slotted lug, and a spring latch on said panel and engageable with the base for releasably retaining said base between said lugs.

BENNETT M. LEECE.